(12) United States Patent
Manabe et al.

(10) Patent No.: US 8,970,186 B2
(45) Date of Patent: Mar. 3, 2015

(54) DC-DC CONVERTER WITH AN AUXILIARY CIRCUIT FOR PERFORMING SOFT-SWITCHING

(75) Inventors: Kota Manabe, Toyota (JP); Takahiko Hasegawa, Toyota (JP); Tomohiko Kaneko, Okazaki (JP); Khalid Hassan Hussein, Chiyoda-ku (JP); Shinji Hatae, Chiyoda-ku (JP)

(73) Assignees: Toyota Jidosha Kabushiki Kaisha, Toyota-Shi (JP); Mitsubishi Electric Corporation, Tokyo (JP)

( * ) Notice: Subject to any disclaimer, the term of this patent is extended or adjusted under 35 U.S.C. 154(b) by 164 days.

(21) Appl. No.: 13/635,835

(22) PCT Filed: Jun. 1, 2011

(86) PCT No.: PCT/IB2011/001197
§ 371 (c)(1),
(2), (4) Date: Sep. 18, 2012

(87) PCT Pub. No.: WO2011/158080
PCT Pub. Date: Dec. 22, 2011

(65) Prior Publication Data
US 2013/0119968 A1    May 16, 2013

(30) Foreign Application Priority Data

Jun. 18, 2010   (JP) .................................. 2010-139032

(51) Int. Cl.
*G05F 1/10* (2006.01)
*G05F 3/08* (2006.01)
(Continued)

(52) U.S. Cl.
CPC ................. *G05F 3/08* (2013.01); *H02M 3/158* (2013.01); *H02M 2001/342* (2013.01); *Y02B 70/1491* (2013.01)
USPC ....................................................... 323/271

(58) Field of Classification Search
CPC ........................................................ G05F 3/08
USPC .................. 323/268, 271, 282, 285, 350, 351
See application file for complete search history.

(56) References Cited

U.S. PATENT DOCUMENTS

| 5,247,241 A | 9/1993 | Ueda |
| 6,961,253 B1 | 11/2005 | Cohen |

(Continued)

FOREIGN PATENT DOCUMENTS

| EP | 1 990 901 A2 | 11/2008 |
| JP | 11-187658 A | 7/1999 |

(Continued)

OTHER PUBLICATIONS

International Search Report and Written Opinion of PCT/IB2011/001197 mailed Sep. 26, 2011.

(Continued)

*Primary Examiner* — Matthew Nguyen
(74) *Attorney, Agent, or Firm* — Kenyon & Kenyon LLP

(57) ABSTRACT

A voltage conversion circuit apparatus that adjusts a timing skew between the switching control of the first switching element and the switching control of the second switching element includes: a skew storage portion that stores a timing skew between the switching controls of the first and second switching elements after the voltage conversion circuit apparatus is manufactured; and a timing adjustment portion that corrects the stored timing skew and thereby adjusts the timing relation between a first pulse signal and a second pulse signal so as to bring within a permissible range the timing skew that occurs when the switching controls of the first and second switching elements are performed by using the first pulse signal and the second pulse signal.

4 Claims, 7 Drawing Sheets

(51) Int. Cl.
*H02M 3/158* (2006.01)
*H02M 1/34* (2007.01)

(56) References Cited

U.S. PATENT DOCUMENTS

| | | | |
|---|---|---|---|
| 7,286,376 B2* | 10/2007 | Yang | 363/97 |
| 7,554,384 B2* | 6/2009 | Dibene et al. | 327/535 |
| 2005/0024908 A1 | 2/2005 | Gizara | |
| 2010/0291445 A1 | 11/2010 | Igarashi | |
| 2010/0316922 A1* | 12/2010 | Hamada et al. | 429/432 |

FOREIGN PATENT DOCUMENTS

| | | |
|---|---|---|
| JP | 2009-159723 A | 7/2009 |
| JP | 2009-163956 A | 7/2009 |
| JP | 2009-163958 A | 7/2009 |
| JP | 2009-165245 A | 7/2009 |
| JP | 2009165246 A | 7/2009 |
| JP | 2009-225531 A | 10/2009 |

OTHER PUBLICATIONS

Office Action issued Apr. 17, 2012 in JP 2010-139032 and English translation thereof.

* cited by examiner

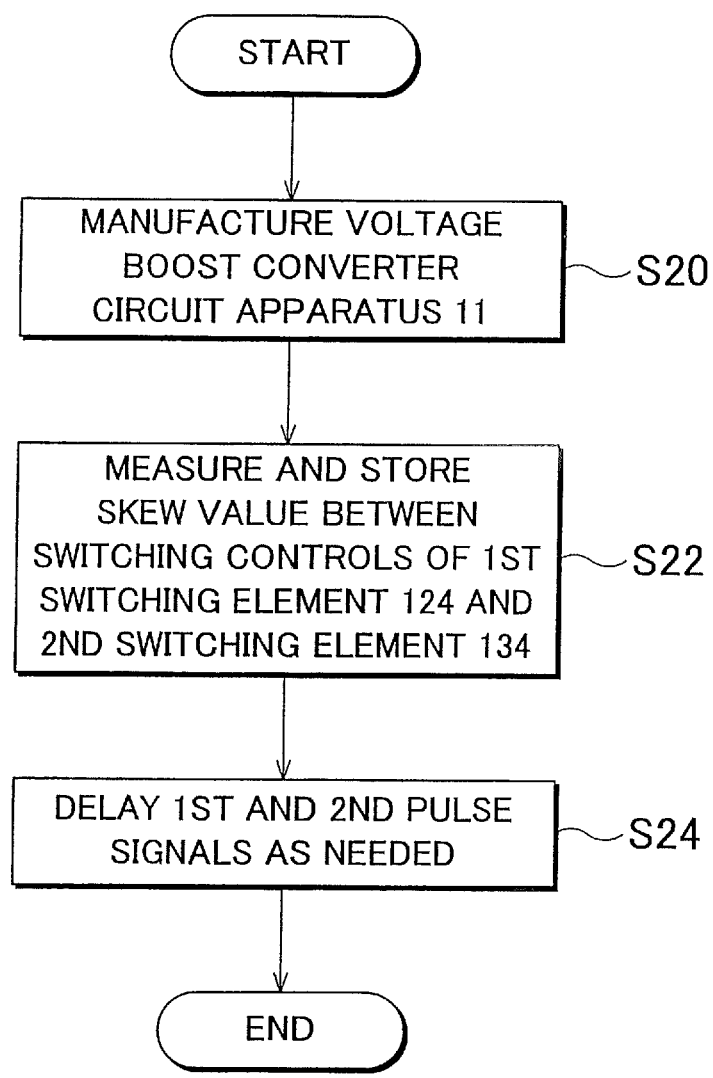

DC-DC CONVERTER WITH AN AUXILIARY CIRCUIT FOR PERFORMING SOFT-SWITCHING

This is a 371 national phase application of PCT/IB2011/001197 filed 1 Jun. 2011, claiming priority to Japanese Patent Application No. 2010-139032 filed 18 Jun. 2010, the contents of which are incorporated herein by reference.

BACKGROUND OF THE INVENTION

1. Field of the Invention

The invention relates to a voltage conversion circuit apparatus and, more particularly, to a voltage conversion circuit apparatus that adjusts a timing skew between switching controls of at least two switching elements.

2. Description of Related Art

Recent years have seen the development of various electric power supply systems in which an electric power supply is constructed by using secondary cells, fuel cells, etc. In such electric power supply systems, for example, a fuel cell system, the output voltage of the fuel cell is converted by a DC-DC converter, and the converted voltage is supplied to a load side. In some cases, a soft-switching circuit construction is adopted in order to reduce the loss of a voltage-boosting switching element of the DC-DC converter. As for the soft-switching circuit construction, various circuits have been devised. Among those, a soft-switching circuit construction that has an auxiliary switch that actively controls a snubber circuit in addition to a main switch that controls a voltage boost circuit is able to perform soft-switching operations in a broad operation region.

An example of the soft-switching circuit construction is a circuit construction that includes a snubber capacitor element provided in parallel with a voltage-boosting switching element. The provision of the snubber capacitor element restrains the occurrence of spike voltage at the time of switching operation of the voltage-boosting switching element. However, despite the soft-switching operation having been performed in order to lessen the switching loss by using this construction, the switching loss sometimes cannot be sufficiently lessened because, in some cases, there is electric charge accumulated in the snubber capacitor element prior to the switching operations of the voltage-boosting switching elements. Therefore, there is provided a charge-removing switching element for performing a switching operation in order to remove the charge accumulated in the snubber capacitor element, prior to the switching operation of the voltage-boosting switching element.

As a technology related to the invention, Japanese Patent Application Publication No. 2009-165245 (JP-A-2009-165245) discloses a construction of a fuel cell system that includes a fuel cell as a direct-current power supply, a voltage boost portion that boosts the output voltage of the fuel cell and applies the boosted voltage to a load, and voltage boost control means for controlling the voltage boost performed by the voltage boost portion. Then, as for the voltage boost portion, this publication discloses a construction that a main voltage boost portion that increases the output voltage of the fuel cell by causing main switch means to perform a switching operation on a main coil that is connected to a high-potential-side terminal of the fuel cell, and a subsidiary voltage boost portion which has a snubber capacitor that is connected in parallel with the main switch means and that is capable of adjusting the voltage that is applied to the main switch means and in which the applied voltage of the snubber capacitor is adjusted according to the voltage boosting operation of the main voltage boost portion. Furthermore, as for the voltage boost control means, the foregoing publication also discloses a construction in which when the output voltage is to be boosted by the voltage boost portion through the switching operation of the main switch means, the voltage boost control means removes charge from the snubber capacitor before the main switch means performs a predetermined switching operation.

By the way, it is necessary that a first pulse signal for performing a switching control of the voltage-boosting switching element (first switching element) and a second pulse signal for performing a switching control of the charge-removing switching element (second switching element) be input to the corresponding switching elements in a predetermined timing relation, and that the switching controls of the two switching elements be performed in a desired timing relation. However, because of differences in the signal propagation time between the pulse signals or of process variations of the switching elements, a timing skew between the switching controls of the switching elements may occur, making it impossible to switch the switching elements in a desired timing relation. This will give rise to a possibility of failing to sufficiently remove the charge accumulated in the snubber capacitor, prior to the switching operation of the voltage-boosting switching element.

SUMMARY OF THE INVENTION

The invention provides a voltage conversion circuit apparatus capable of adjusting the timing skew so that the skew value (the timing skew) of the switching control becomes zero (0) in the case where the switching controls of two switching elements are performed by using a first pulse signal and a second pulse signal.

A voltage conversion circuit apparatus according to an aspect of the invention adjusts a timing skew of the switching control of switching elements after the voltage conversion circuit apparatus is manufactured. The voltage conversion circuit apparatus includes: a voltage conversion circuit that includes a first switching element that performs a switching operation in order to accumulate energy in a reactor element, and a capacitor element provided in parallel with the first switching element, and a second switching element that performs a switching operation in order to remove charge from the capacitor element before the first switching element performs the switching operation; a pulse signal generation portion that generates a first pulse signal for performing a switching control of the first switching element, and a second pulse signal for performing a switching control of the second switching element, so that the first pulse signal and the second pulse signal have a predetermined timing relation; a switching control portion that performs the switching control of each of the first switching element and the second switching element by using a skew-storing pulse signal in a predetermined timing relation after the voltage conversion circuit apparatus is manufactured; a skew storage portion that stores a timing skew between the switching control of the first switching element and the switching control of the second switching element; and a timing adjustment portion that corrects the timing skew stored, and thereby adjusts a timing relation between the first pulse signal and the second pulse signal so that the timing skew that occurs when the switching control of the first switching element and the switching control of the second switching element are performed by using the first pulse signal and the second pulse signal is within a permissible range.

In the voltage conversion circuit apparatus according to the foregoing aspect of the invention, the timing adjustment portion may adjust the timing relation between the first pulse signal and the second pulse signal so that the timing skew that occurs when the switching control of the first switching element and the switching control of the second switching element are performed is zero.

Besides, in the voltage conversion circuit apparatus according to the foregoing aspect of the invention, the skew storage portion may measure a timing error that occurs when the switching control portion controls each of the first switching element and the second switching element to an on-state by using the skew-storing pulse signal, and may store the timing error as the timing skew.

Besides, in the voltage conversion circuit apparatus according to the foregoing aspect of the invention, when voltage of each of the first switching element and the second switching element is greater than a predetermined threshold voltage, the skew storage portion may determine that the first switching element and the second switching element have been controlled to the on-state.

Besides, in the voltage conversion circuit apparatus according to the foregoing aspect of the invention, the timing adjustment portion may make a change such that the pulse signal generation portion generates the first pulse signal and the second pulse signal in a timing relation considering the timing skew.

Besides, in the voltage conversion circuit apparatus according to the foregoing aspect of the invention, the timing adjustment portion may be a delay adjustment circuit that delays the first pulse signal and the second pulse signal so that the timing skew is within the permissible range.

According to the voltage conversion circuit apparatus constructed as described above, it is possible to correct the stored timing skew and thereby adjust the timing relation between the first pulse signal and the second pulse signal so as to bring within a permissible range (or equal to zero) the timing skew that occurs when the switching controls of the first and second switching elements are performed by using the first pulse signal and the second pulse signal.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart showing a procedure of manufacturing the voltage boost converter circuit apparatus and then adjusting the skew in the embodiment of the invention.

DETAILED DESCRIPTION OF EMBODIMENTS

Figure 1:
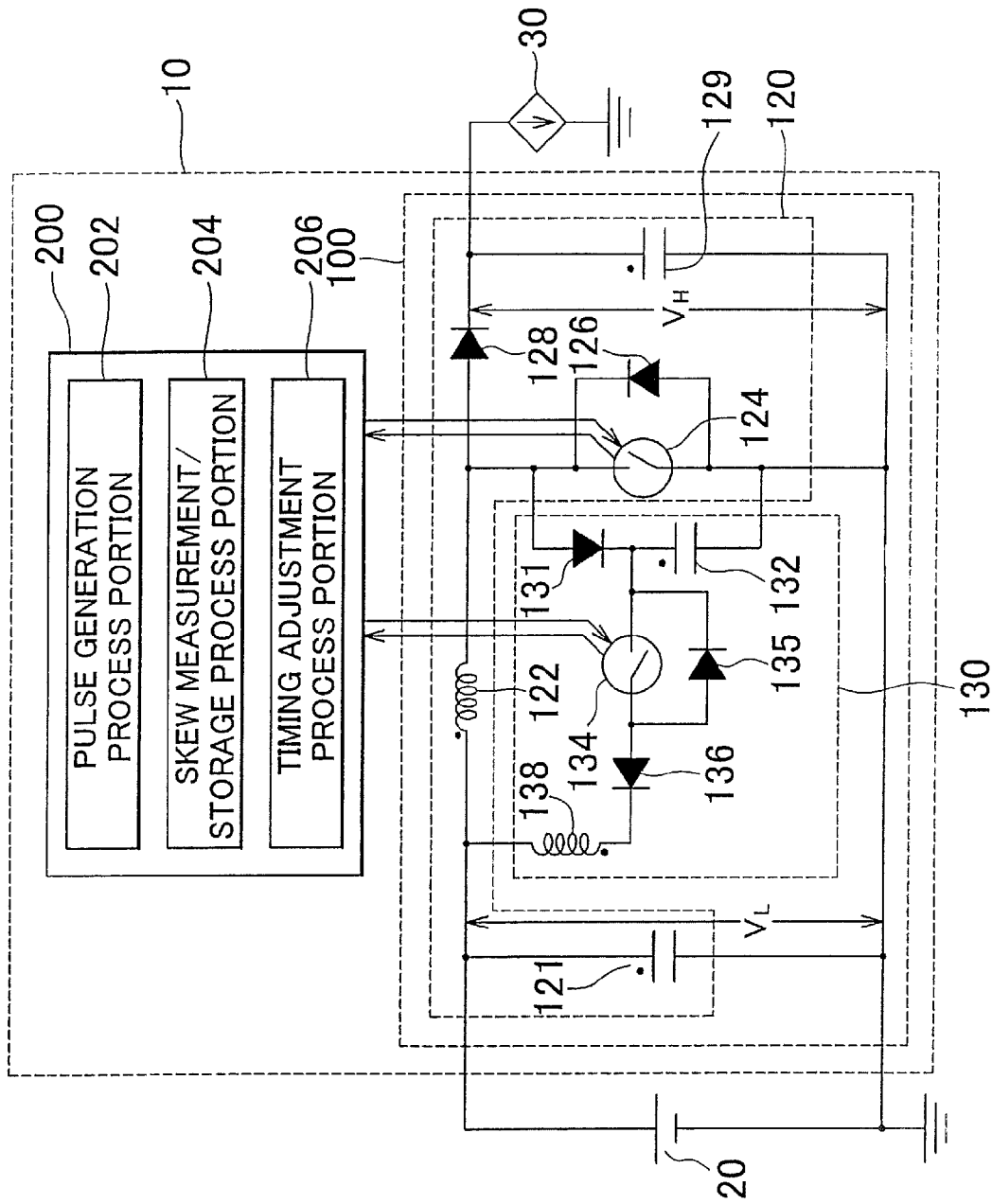
FIG. 1 is a diagram showing a voltage boost converter circuit apparatus that includes a voltage boost converter circuit and a control portion in an embodiment of the invention.

Hereinafter, like elements in the drawings are denoted by the same reference characters, and redundant descriptions will be omitted. Besides, in the description below, a reference character used to denote a portion or the like will be later used again to denote a similar or the same portion or the like as needed.

FIG. 1 is a diagram showing a voltage boost converter circuit apparatus 10 that includes a voltage boost converter circuit 100 and a control portion 200. The voltage boost converter circuit apparatus 10 is provided between a fuel cell 20 that generates electric power by electrochemical reactions and a load device 30 that is driven by electric power from the fuel cell 20. The voltage boost converter circuit apparatus 10 is a voltage conversion circuit apparatus that boosts the output voltage (direct-current voltage) of the fuel cell 20 to a predetermined voltage, and that supplies the boosted voltage (direct-current voltage) to the load device 30. It is to be noted herein that the load device 30 includes an inverter circuit that converts the direct-current voltage output by the voltage boost converter circuit apparatus 10 into an alternating-current voltage, and an electric motor that is rotationally driven by the alternating-current voltage. Although it has been described above that the voltage conversion circuit apparatus in this embodiment is the voltage converter circuit apparatus 10, the voltage conversion circuit apparatus may also be a step-up/down voltage converter circuit apparatus that reduces voltage besides boosting voltage.

The voltage boost converter circuit 100 includes a main voltage boost circuit 120 for performing a voltage-boosting operation as a DC-DC converter, and an auxiliary circuit 130 for performing a soft-switching operation.

The main voltage boost circuit 120 includes a capacitor 121, a coil 122, a first switching element 124, a diode 126, a diode 128, and a capacitor 129.

A positive electrode-side terminal of the capacitor 121 is connected to a positive electrode-side terminal of the fuel cell 20, and a negative electrode-side terminal of the capacitor 121 is connected to a negative electrode-side terminal of the fuel cell 20. The capacitor 121 has a function of smoothing fluctuations of the voltage of the fuel cell 20. Incidentally, the negative electrode-side terminal of the fuel cell 20 is grounded.

The coil 122 is a rector element whose positive electrode-side terminal is connected to the positive electrode-side terminal of the fuel cell 20, and whose negative electrode-side terminal is connected to one of two side terminals of the first switching element 124.

The one side terminal of the first switching element 124 is connected to the negative electrode-side terminal of the coil 122, and the other side terminal of the first switching element 124 is connected to the negative electrode-side terminal of the fuel cell 20.

The diode 126 is a rectifier element whose cathode terminal is connected to the one side terminal of the first switching element 124, and whose anode terminal is connected to the other side terminal of the first switching element 124.

The diode 128 is a rectifier element whose anode terminal is connected to the negative electrode-side terminal of the coil 122, and whose cathode terminal is connected to a positive electrode-side terminal of the capacitor 129.

The positive electrode-side terminal of the capacitor 129 is connected to one of two side terminals of the load device 30, and a negative electrode-side terminal of the capacitor 129 is connected to the negative electrode-side terminal of the fuel cell 20. The capacitor 129 performs the smoothing of fluctuations of the boosted voltage.

It is to be noted herein that the main voltage boost circuit 120 boosts the output voltage of the fuel cell 20 by releasing the energy stored in the coil 122 to the load device 30 side by the switching operation of a switching circuit that is constructed of the first switching element 124 and the diode 126.

The auxiliary circuit 130 includes a diode 131, a snubber capacitor 132, a second switching element 134, a diode 135, a diode 136, and a coil 138.

The diode 131 is a rectifier element whose anode terminal is connected to the one side terminal of the first switching element 124, and whose cathode terminal is connected to a positive electrode-side terminal of the snubber capacitor 132.

The snubber capacitor 132 is a capacitor element whose positive electrode-side terminal is connected to the cathode terminal of the diode 131, and whose negative electrode-side terminal is connected to the other side terminal of the first switching element 124. That is, the snubber capacitor 132 is connected in parallel with the first switching element 124, and has a function of restraining the spike voltage that occurs when the first switching element 124 performs switching.

One of two side terminals of the second switching element 134 is connected to the positive electrode-side terminal of the snubber capacitor 132, and the other side terminal of the second switching element 134 is connected to an anode terminal of the diode 136.

The diode 135 is a rectifier element whose anode terminal is connected to the other side terminal of the second switching element 134, and whose cathode terminal is connected to the one side terminal of the second switching element 134.

The diode 136 is a rectifier element whose anode terminal is connected to the other side terminal of the second switching element 134, and whose cathode terminal is connected to a positive electrode-side terminal of the coil 138.

The coil 138 is a reactor element whose positive electrode-side terminal is connected to the cathode terminal of the diode 136, and whose negative electrode-side terminal is connected to the positive electrode-side terminal of the coil 122.

Figure 2:
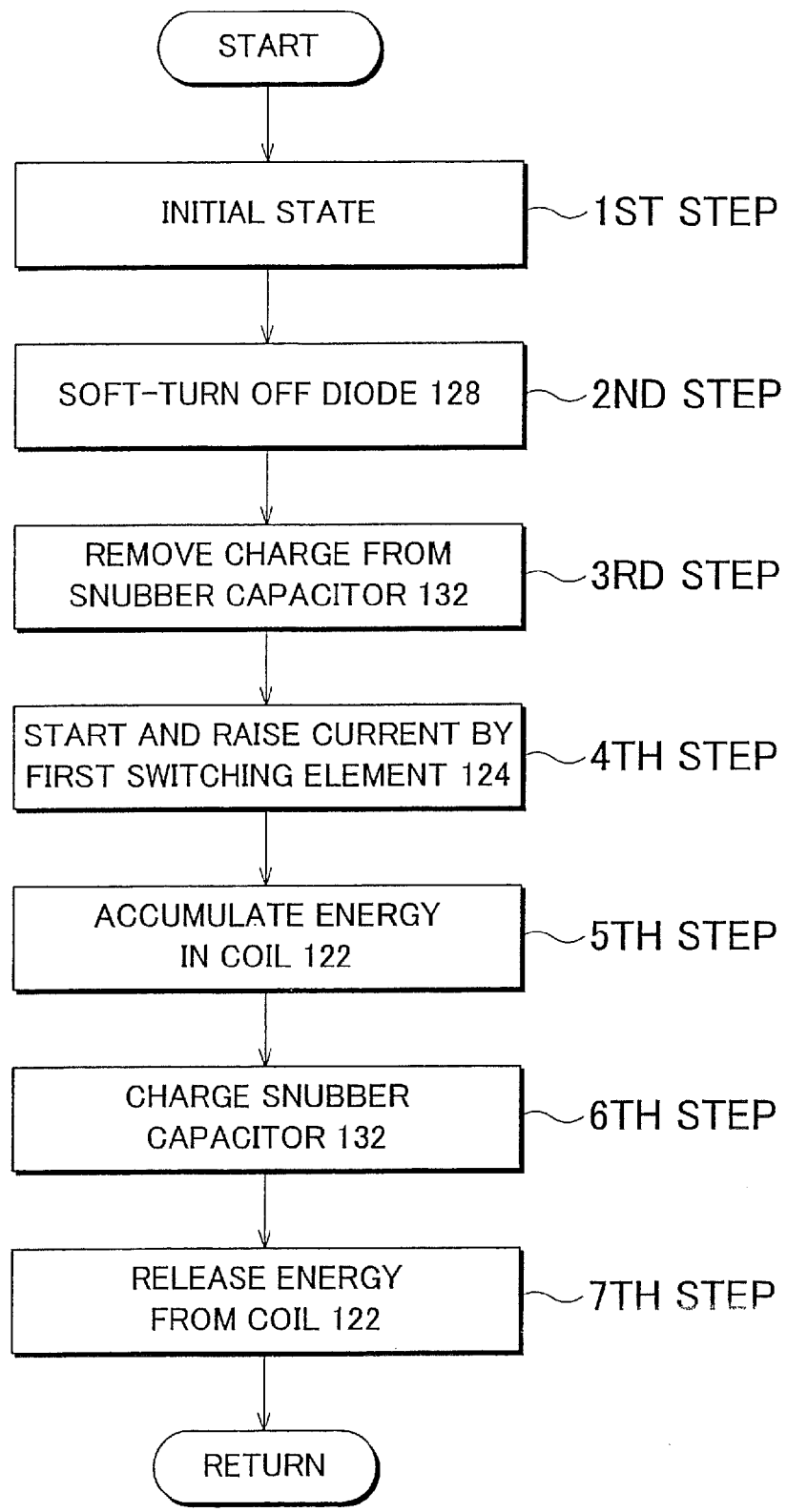
FIG. 2 is a flowchart showing a procedure of a soft-switching process of the voltage boost converter circuit in the embodiment of the invention.

Next, a soft-switching operation of lessening the switching loss of the first switching element 124 in the voltage boost converter circuit 100 will be described with reference to FIG. 2. FIG. 2 is a flowchart showing a procedure of the soft-switching process of the voltage boost converter circuit 100. A first step (initial state) in which the soft-switching process is performed is a state in which electric power is supplied from the fuel cell 20 to the load device 30, and in which the first switching switching device 124 and the second switching device 134 are both controlled to an off-state. During this state, the current that flows via the coil 122 and the diode 128 is supplied to the load device 30 side.

Subsequently, in a second step, the first switching element 124 remains controlled to the off-state, but the control of the second switching element 134 is switched from the off-state control to the on-state control. As a result, due to a potential difference between the output voltage VH and the input voltage VL of the voltage boost converter circuit 100, the current having been flowing to the load device 30 side via the coil 122 and the diode 128 now gradually comes to flow to the auxiliary circuit 130 side via the diode 131.

When the state of the second step has continued for a predetermined time, the current that flows through the diode 128 reaches zero. Then, in a third step, due to the potential difference between the snubber capacitor 132 and the voltage VL of the fuel cell 20, charge stored in the snubber capacitor 132 flows into the coil 138 via the diode 136. It is to be noted herein that the charge of the snubber capacitor 132 affects the voltage that is applied to the first switching element 124 when the first switching element 124 is controlled to the on-state. However, in the third step, as charge of the snubber capacitor 132 flows into the coil 138, the voltage across the snubber capacitor 132 gradually falls. At this time, current flows until the voltage of the snubber capacitor 132 reaches zero, due to the half-wave resonance between the snubber capacitor 132 and the coil 138.

Next, in a fourth step, after the snubber capacitor 132 entirely releases its charge, the control of the first switching element 124 is switched from the off-state control to the on-state control. It is to be noted herein that in the third step, since the voltage of the snubber capacitor 132 is caused to become zero, the voltage across the first switching element 124 also becomes zero. Then, in this state, the first switching element 124 is controlled to the on-state. This means that current begins to be caused to flow through the first switching element 124 after the voltage across the first switching element 124 is brought to zero. Therefore, the switching loss of the first switching element 124 can be eliminated.

After the state of the fourth step continues for a predetermined time, a fifth step is performed in which the amount of current that flows into the coil 122 is increased and therefore the amount of energy stored in the coil 122 gradually increases.

Subsequently, after a desired amount of energy is stored in the coil 122, a sixth step is performed in which the first switching element 124 and the second switching element 134 are switched from the on-state control to the off-state control. At this time, the snubber capacitor 132, which has fully discharged to a voltage of 0 due to the third step, is charged again to a voltage equal to the output voltage VH of the voltage boost converter circuit 100.

After the snubber capacitor 132 is charged to the voltage VH, a seventh step is performed in which the energy stored in the coil 122 is released to the load device 30 side. After the seventh step ends, the process returns.

Thus, by performing the soft-switching process, the charge stored in the snubber capacitor 132 can be removed therefrom before the switching operation of the first switching element 124 is performed. This makes it possible to greatly reduce the switching loss of the main voltage boost circuit 120.

Figure 3:
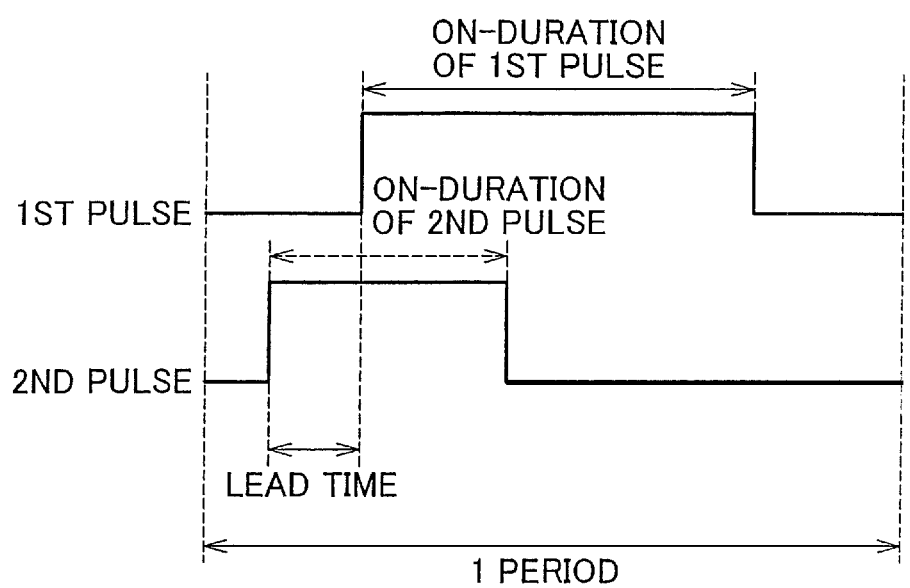
FIG. 3 is a diagram showing a timing relation between the timing of a switching control of a first switching element and the timing of a switching control of the second switching element which relation is needed in order to perform the soft-switching process, in the embodiment of the invention.

It is to be noted herein that in order to realize the soft-switching process shown in the flowchart of the FIG. 2, it is necessary to bring the timing of the switching control of the first switching element 124 and the timing of the switching control of the second switching element 134 into a timing relation shown in FIG. 3. FIG. 3 is a diagram showing a timing relation between the timing of the switching control of the first switching element 124 and the timing of the switching control of the second switching element 134 which needs to be established in order to perform the soft-switching process. There is one critical constraint for the realization of the soft-switching process. This constraint is that in order to certainly remove the charge accumulated in the snubber capacitor 132 prior to the switching operation of the first switching element 124, the lead time from when the second switching element 134 is controlled to the on-state to when the first switching element 124 is controlled to the on-state needs to be equal to or greater than a predetermined time. Therefore, in order for the lead time to become equal to or greater than a predetermined time, the skew value between the timing at which the second switching element 134 is controlled to the on-state and the timing at which the first switching element 124 is controlled to the on-state needs to be within a permissible range.

Incidentally, the foregoing constraint regarding the timing is described above as being a constraint that in order to certainly remove the charge accumulated in the snubber capacitor 132 prior to the switching operation of the first switching element 124, the lead time from when the second switching element 134 is controlled to the on-state to when the first switching element 124 is controlled to the on-state needs to be equal to or greater than a predetermined time. However, the constraint regarding the timing may also be a constraint regarding timing other than that, for example, a constraint that the time from when the second switching element 134 is controlled to the off-state to when the first switching element 124 is controlled to the off-state needs to be equal to or greater than a predetermined time.

The control portion 200 has a function of controlling the voltage boost converter circuit 100. In particular, a function of performing a skew adjustment such that the skew will be within a permissible range in a timing constraint that is needed in order to realize the soft-switching process will be described below. The control portion 200 includes a pulse generation process portion 202, a skew measurement/storage process portion 204, and a timing adjustment process portion 206.

The pulse generation process portion 202 has a function of generating and outputting a first pulse signal (a signal for performing the switching control of the first switching element 124) and a second pulse signal (a signal for performing the switching control of the second switching element 134) in a relation shown in FIG. 3 so that the lead time from when the second pulse signal rises and to when the first pulse signal rises becomes equal to a predetermined time. Concretely, the first pulse signal and the second pulse signal are generated by setting a reference voltage for the first pulse signal and the reference voltage for the second pulse signal through the use of a comparator that compares a triangular wave having a predetermined period and a predetermined reference voltage.

Figure 4:
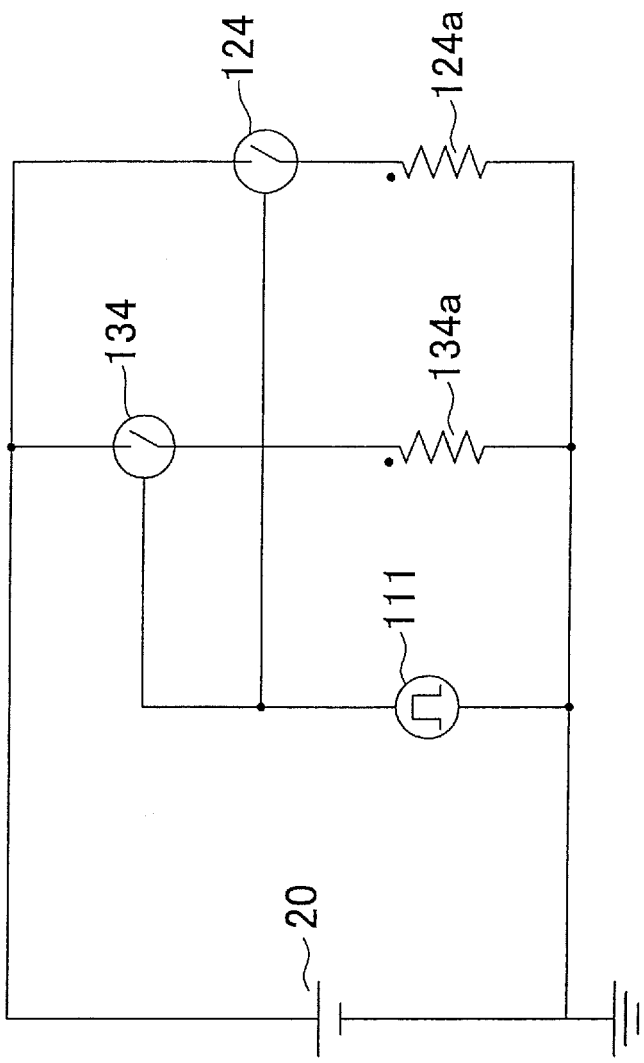
FIG. 4 is a schematic diagram illustrating that a skew measurement/storage process portion measures and stores as a timing skew an error that occurs when the first switching element and the second switching element are each controlled to an on-state, in the embodiment of the invention.

The skew measurement/storage process portion 204 has a function of performing the switching control of the first switching element 124 and the second switching element 134 by using two identical pulse signals (i.e., by using, instead of the first pulse signal and the second pulse signal, skew measuring/storing signals that rise at the same timing and, after the elapse of a predetermined period, rise again at the same timings) when the voltage boost converter circuit apparatus 10 becomes ready to be shipped as a product after having been manufactured. Then, the skew measurement/storage process portion 204 measures and stores as a timing skew an error that occurs when the first switching element 124 and the second switching element 134 are controlled to the on-state by the skew measuring/storing signals. It is to be noted herein that it is determined that the first switching element 124 and the second switching element 134 have been controlled to the on-state when the voltage across the first switching element 124 and across the second switching element 134 exceeds a threshold voltage (e.g., 10% of the power supply voltage). Incidentally, although the skew measurement/storage process portion 204 has been described above as a portion that measures and stores as a timing skew an error that occurs when the first switching element 124 and the second switching element 134 are each controlled to the on-state, the skew measurement/storage process portion 204 may also be a portion that measures and stores as a timing skew an error that occurs when the first switching element 124 and the second switching element 134 are each controlled to the off-state. Incidentally, a timing skew between the switching control of the first switching element 124 and the switching control of the second switching element 134 occurs because of a circuit delay that is a time until the respective pulse signals reach the corresponding switching elements, the process variations of the switching elements, etc. FIG. 4 is a schematic diagram illustrating that the skew measurement/storage process portion 204 measures and stores as a timing skew an error that occurs when the first switching element 124 and the second switching element 134 are each controlled to the on-state. As shown in FIG. 4, when the timing skew is to be measured, a resistance element 124a is connected in series to the first switching element 124, and a resistance element 134a is connected in series to the second switching element 134, in order to prevent flow of short-circuit current. Then, as shown in FIG. 4, the same pulse signals (the skew measuring/storing signals 111) are input to the first switching element 124 and the second switching element 134, and each of the two elements measures and store as a timing skew the error that occurs at the time of being controlled to the on-state.

The timing adjustment process portion 206 has a function of adjusting the timings of the first pulse signal and the second pulse signal so as to bring to zero the timing skew that occurs when the switching controls of the first switching element 124 and the second switching element 134 are performed by using the first pulse signal and the second pulse signal on the basis of the skew value detected by the skew measurement/storage process portion 204. Besides, the timing adjustment process portion 206 has a function of correcting the pulse signals to be output (the first pulse signal and the second pulse signal) on the basis of the skew value stored by the skew measurement/storage process portion 204, and of outputting the pulse signals (the first and second pulse signals) that theoretically have a skew of zero. Concretely, the timings of generating the first pulse signal and the second pulse signal are adjusted by changing the value of the reference voltage for the first pulse signal and the value of the reference voltage for the second pulse signal that are compared by a comparator of the pulse generation process portion 202 so that the skew value becomes zero.

Figure 5:
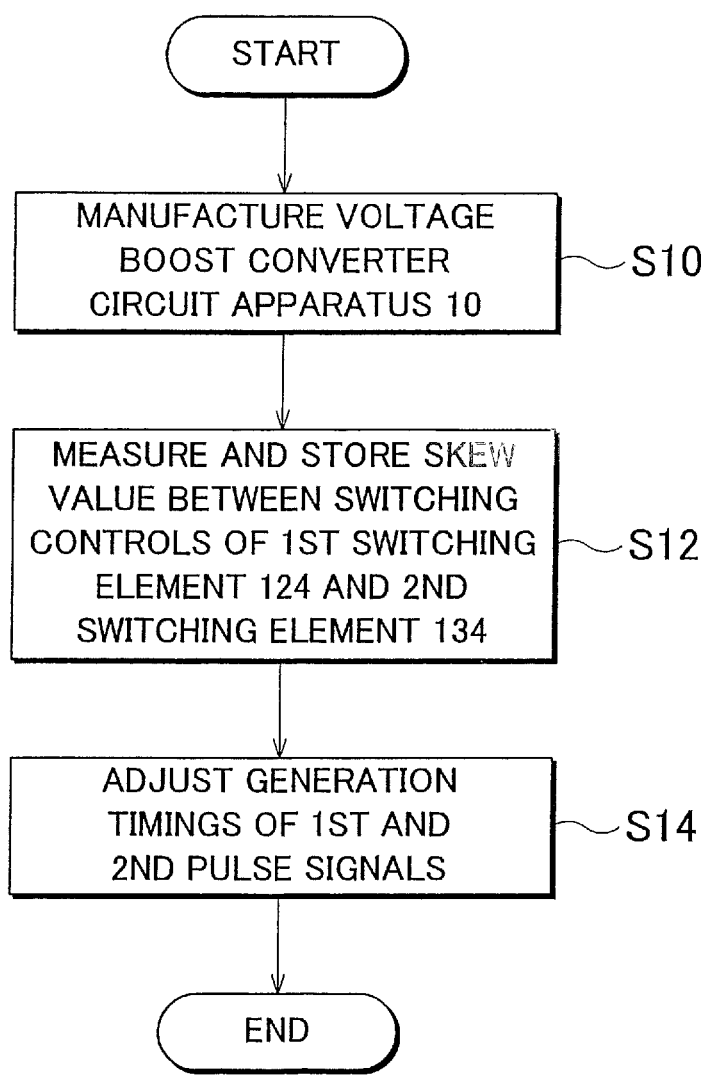
FIG. 5 is a flowchart showing a procedure of manufacturing the voltage boost converter circuit apparatus and then adjusting the skew in the embodiment of the invention.

Operation of the voltage boost converter circuit apparatus 10 having the foregoing construction will be described with reference to FIGS. 1 to 5. FIG. 5 is a flowchart showing a procedure of manufacturing the voltage boost converter circuit apparatus 10 and then adjusting the skew. Firstly, the voltage boost converter circuit apparatus 10 is manufactured by performing a manufacture process that is well known with respect to the voltage boost converter circuit apparatus 10 (S10). At this time, because of the circuit delay that is a time required before each pulse signal reaches a corresponding one of the switching elements, the process variations of the switching elements, etc., there occurs a timing skew between the switching control of the first switching element 124 and the switching control of the second switching element 134.

Next, after the voltage boost converter circuit apparatus 10 is manufactured, the timing skew between the switching control of the first switching element 124 and the switching control of the second switching element 134 is measured and stored by the skew measurement/storage process portion 204 of the control portion 200 (S12). Concretely, the switching control of the first switching element 124 and the switching control of the second switching element 134 are performed by using the skew measuring/storing signals instead of the first pulse signal and the second pulse signal, and the error that occurs when the first switching element 124 and the second switching element 134 are controlled to the on-state by the skew measuring/storing signals is measured and stored as a timing skew.

Then, the timings of generating the first pulse signal and the second pulse signal are adjusted by the timing adjustment process portion 206 changing the value of the reference voltage for the first pulse signal and the value of the reference voltage for the second pulse signal that are compared by the comparator of the pulse generation process portion 202 so that the skew value will be within a permissible range (equal to zero), on the basis of the skew value stored by the skew measurement/storage process portion 204. After S14, the process ends.

As described above, according to the voltage boost converter circuit apparatus 10, it is possible to measure the actual skew value after the voltage boost converter circuit apparatus 10 is tentatively manufactured, and then adjust the generation timings for the first pulse signal and the second pulse signal so that the skew value will be within the permissible range (or equal to zero). Thus, according to the voltage boost converter circuit apparatus 10, the generation timings for the pulse signals are adjusted so that the skew value will be within the permissible range, postulating that a skew value actually will occur. Therefore, the skew adjustment can be more simply performed without a need for a costly provision or countermeasure such as special selection of component parts of the voltage boost converter circuit apparatus 10 (e.g. selection of component parts that are less likely to cause a skew), or the like.

Figure 6:
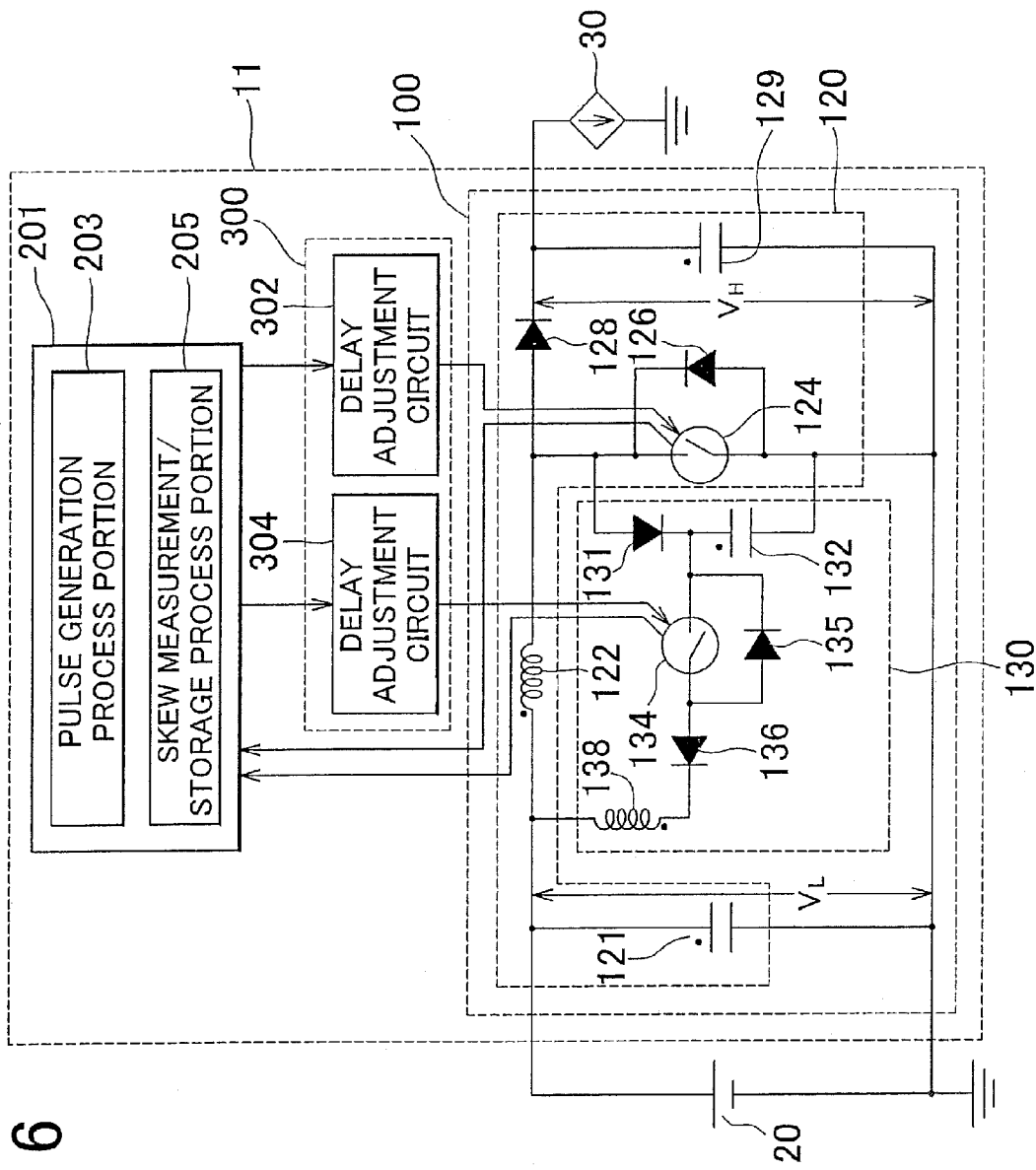
FIG. 6 is a diagram showing a voltage boost converter circuit apparatus that includes a voltage boost converter circuit, a control portion and a timing adjustment circuit portion, in the embodiment of the invention.

Next, a voltage boost converter circuit apparatus 11 as a modification of the foregoing voltage boost converter circuit apparatus 10 will be described. The voltage boost converter circuit apparatus 11 is different from the voltage boost converter circuit apparatus 10 only in a control portion 201 and a timing adjustment circuit portion 300. Therefore, those differences will be mainly described. FIG. 6 is a diagram showing the voltage boost converter circuit apparatus 11 that includes a voltage boost converter circuit 100 as well as the control portion 201 and the timing adjustment circuit portion 300.

The control portion 201 includes a pulse generation process portion 203 and a skew measurement/storage process portion 205. This pulse generation process portion 203 performs substantially the same function as the above-described pulse generation process portion 202 of the control portion 200, and will not be described in detail below. The skew measurement/storage process portion 205 measures and stores the skew value similarly to the skew measurement/storage process portion 204 of the control portion 200. In addition to the function of measuring and storing the skew value, the skew measurement/storage process portion 205 has a function of calculating a delay value that is needed in order to bring the skew value into a permissible range (to zero), and sending information regarding the delay value to the timing adjustment circuit portion 300 in order to cause the timing adjustment circuit portion 300 to delay the first pulse signal and the second pulse signal. Incidentally, as for the function of measuring and storing the skew value in the skew measurement/storage process portion 205, the skew value is measured and stored by substantially the same construction as illustrated in the schematic diagram of FIG. 4 that is referred to above to describe the skew measurement/storage process portion 204, and therefore detailed description thereof will be omitted below. Besides, although the skew measurement/storage process portion 205 is described above as being incorporated into the control portion 201, the skew measurement/ storage process portion 205 may also be packaged in an appliance other than the control portion 201, for example, an inspection machine for inspecting the voltage boost converter circuit apparatus 11.

The timing adjustment circuit portion 300 includes a delay adjustment circuit 302 and a delay adjustment circuit 304. The delay adjustment circuit 302 is a circuit for delaying the first pulse signal generated by the pulse generation process portion 203, by a necessary time, on the basis of the delay value information from the skew measurement/storage process portion 205 of the control portion 201. The delay adjustment circuit 304 is a circuit for delaying the second pulse signal generated by the pulse generation process portion 203, by a necessary time, on the basis of the delay value information from the skew measurement/storage process portion 205 of the control portion 201. Concretely, the delay adjustment circuit 302 and the delay adjustment circuit 304 are each able to make a delay of a necessary time by selecting a combination of buffer circuits that have various amounts of delay. Besides, the delay adjustment circuit 302 and the delay adjustment circuit 304 may employ a construction that makes a delay of a necessary time by selecting a combination of resistance elements and capacitor elements that have various amounts of delay.

Operation of the voltage boost converter circuit apparatus 11 will be described with reference to FIGS. 6 and 7. FIG. 7 is a flowchart showing a procedure of manufacturing the voltage boost converter circuit apparatus 11 and then adjusting the skew. Firstly, the voltage boost converter circuit apparatus 11 is manufactured by performing a manufacture process that is well known with respect to the voltage boost converter circuit apparatus 11 (S20).

Next, after the voltage boost converter circuit apparatus 11 is manufactured, the timing skew between the switching control of the first switching element 124 and the switching control of the second switching element 134 is measured and stored by the skew measurement/storage process portion 205 of the control portion 201 (S22).

Then, delay adjustment is performed in the delay adjustment circuit 302 and the delay adjustment circuit 304 so the first pulse signal and the second pulse signal are delayed by their respective necessary delay times, in order to bring the skew value into a permissible range (to zero), on the basis of the skew value detected by the skew measurement/storage process portion 205. After S24, the process ends.

As described above, according to the voltage boost converter circuit apparatus 11, it is possible to measure the actual skew value after the voltage boost converter circuit apparatus 11 is tentatively manufactured, and delay the first pulse signal and the pulse signal by necessary amounts of time so that the skew value will be within a permissible range. Thus, the skew adjustment can be performed even more simply by the voltage boost converter circuit apparatus 11.

Incidentally, in both the voltage boost converter circuit apparatuses 10 and 11, the skew value is measured by using the skew measuring/storing signals that are in a relation of the same timing. However, it is also permissible to detect as a skew value an error between a desired lead time of the second pulse signal to the first pulse signal and a lead time thereof that occurs when the first pulse signal and the second pulse signal generated in a relation shown in FIG. 3 are input to the first switching element 124 and the second switching element 134.

Besides, in the foregoing voltage boost converter circuit apparatuses 10 and 11, after tentative manufacture thereof, the actual skew is measured, and the timings of the first pulse signal and the second pulse signal are automatically adjusted.

However, the timings of the first pulse signal and the second pulse signal may also be adjusted by recording the skew value in a flash ROM or the like, and manually changing the value of the reference voltage for the first pulse signal and the value of the reference voltage for the second pulse signal, or changing the amounts of delay that are made by the delay adjustment circuits 302 and 304, respectively.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A voltage conversion circuit apparatus that adjusts a timing skew of the switching control of switching elements after the voltage conversion circuit apparatus is manufactured, the voltage conversion circuit apparatus comprising:
a voltage conversion circuit that includes a first switching element that performs a switching operation in order to accumulate energy in a reactor element, a capacitor element provided in parallel with the first switching element, and a second switching element that performs a switching operation in order to remove charge from the capacitor element before the first switching element performs the switching operation;
a pulse signal generation portion that generates a first pulse signal for performing a switching control of the first switching element, and a second pulse signal for performing a switching control of the second switching element, so that the first pulse signal and the second pulse signal have a predetermined timing relation;
a switching control portion that performs the switching control of each of the first switching element and the second switching element by using a skew-storing pulse signal in a predetermined timing relation after the voltage conversion circuit apparatus is manufactured;
a skew storage portion that stores a timing skew between the switching control of the first switching element and the switching control of the second switching element; and
a timing adjustment portion that corrects the timing skew stored, and thereby adjusts a timing relation between the first pulse signal and the second pulse signal so that the timing skew that occurs when the switching control of the first switching element and the switching control of the second switching element are performed by using the first pulse signal and the second pulse signal is within a permissible range,
wherein the timing adjustment portion adjusts the timing relation between the first pulse signal and the second pulse signal so that the timing skew that occurs when the switching control of the first switching element and the switching control of the second switching element are performed is zero, and
wherein the timing adjustment portion makes a change such that the pulse signal generation portion generates the first pulse signal and the second pulse signal in a timing relation considering the timing skew.

2. The voltage conversion circuit apparatus according to claim 1, wherein the skew storage portion measures a timing error that occurs when the switching control portion controls each of the first switching element and the second switching element to an on-state by using the skew-storing pulse signal, and stores the timing error as the timing skew.

3. The voltage conversion circuit apparatus according to claim 2, wherein when voltage of each of the first switching element and the second switching element is greater than a predetermined threshold voltage, the skew storage portion determines that the first switching element and the second switching element have been controlled to the on-state.

4. The voltage conversion circuit apparatus according to claim 1, wherein the timing adjustment portion is a delay adjustment circuit that delays the first pulse signal and the second pulse signal so that the timing skew is within the permissible range.

* * * * *